(12) United States Patent
Molenda et al.

(10) Patent No.: US 8,846,135 B2
(45) Date of Patent: Sep. 30, 2014

(54) PROCESS FOR THE PREPARATION OF CONDUCTIVE CARBON LAYERS ON POWDERED SUPPORTS

(75) Inventors: Marcin Molenda, Cracow (PL); Roman Dziembaj, Cracow (PL); Andrzej Kochanowski, Cracow (PL); Edgar Bortel, Cracow (PL); Marek Drozdek, Ledzice (PL); Zofia Piwowarska, Cracow (PL)

(73) Assignee: Uniwersytet Jagiellonski, Krakow (PL)

( * ) Notice: Subject to any disclaimer, the term of this patent is extended or adjusted under 35 U.S.C. 154(b) by 455 days.

(21) Appl. No.: 13/027,787

(22) Filed: Feb. 15, 2011

(65) Prior Publication Data

US 2011/0151112 A1 Jun. 23, 2011

Related U.S. Application Data

(63) Continuation of application No. PCT/PL2009/000081, filed on Aug. 13, 2009.

(30) Foreign Application Priority Data

Aug. 19, 2008 (PL) .......................................... 385908

(51) Int. Cl.
| | |
|---|---|
| B05D 5/12 | (2006.01) |
| C23C 18/12 | (2006.01) |
| H01M 4/02 | (2006.01) |
| H01M 4/13 | (2010.01) |
| H01M 4/133 | (2010.01) |

(52) U.S. Cl.
CPC ............ *C23C 18/1258* (2013.01); *H01M 4/133* (2013.01); *C23C 18/125* (2013.01)
USPC .............................. 427/122; 427/58; 429/211

(58) Field of Classification Search
USPC ........................................................ 427/122
See application file for complete search history.

(56) References Cited

U.S. PATENT DOCUMENTS

| | | | |
|---|---|---|---|
| 4,599,193 A | | 7/1986 | Murase et al. |
| 4,915,984 A | | 4/1990 | Murakami |
| 2002/0045045 A1 | * | 4/2002 | Adams et al. .................. 428/403 |
| 2004/0033360 A1 | * | 2/2004 | Armand et al. ............... 428/408 |
| 2004/0132845 A1 | * | 7/2004 | Rhine et al. ...................... 521/82 |
| 2006/0068295 A1 | | 3/2006 | Xu et al. |
| 2007/0134484 A1 | | 6/2007 | Yamada et al. |
| 2008/0166474 A1 | | 7/2008 | Deguchi et al. |
| 2009/0183650 A1 | | 7/2009 | Doeff et al. |

FOREIGN PATENT DOCUMENTS

| | | |
|---|---|---|
| DE | 285 853 | 1/1991 |
| EP | 0205970 | 12/1986 |
| EP | 1724298 | 11/2006 |
| JP | 2006310011 | 11/2006 |
| JP | 2006324183 | 11/2006 |
| WO | 2007094240 | 8/2007 |
| WO | 2008088573 | 7/2008 |

OTHER PUBLICATIONS

Hudson "Pyrolysis of polymer-derived carbons in the formation of graphitizing carbons and nanoparticles of zirconia" Mar. 12, 2008.*
Doeff "Optimization of Carbon coatings on LiFePO4" 2006.*
Molenda "Direct preparation of conductive carbon layer (CCL) on alumina as a model system for direct preparation of carbon coated particles of the composite Li-ion electrodes" 2007.*
International Search Report and Written Opinion of the International Searching Authority for corresponding International Application No. PCT/PL2009/000081, issued by the European Patent Office Apr. 1, 2010.
"Direct Preparation of Conductive Carbon Layer (CCL) on Alumina as a Model System for Direct Preparation of Carbon Coated Particles of the Composite Li-Ion Electrodes" (M. Molenda, R. Dziembaj, M. Drozdek, E. Podstawka, L.M. Proniewicz) Solid State Ionics 179, 2008, 197-201.
"A new method of coating powdered supports with conductive carbon films" (M. Molenda, R. Dziembaj, Z. Piwowarska, M. Drozdek) J. Therm. Anal. Cal., 88, 2007, 503-506.
Polish Search Report for corresponding Polish Patent Application No. 385908 issued Sep. 20, 2008.

* cited by examiner

*Primary Examiner* — Michael Cleveland
*Assistant Examiner* — Austin Murata
(74) *Attorney, Agent, or Firm* — Myers Wolin, LLC

(57) ABSTRACT

A process for the preparation of carbon layers on powdered supports comprising dissolving a hydrophilic polymer (PH) at the level of 85 do 99.9% by weight in water, adding pyromellitic acid (PMA) or pyromellitic dianhydride (PMDA) at the level of 0.1-15% by weight, then introducing to the mixture the powdered support at a level of 1-99% by weight. The suspension is concentrated and dried, and the composite precursor formed is subjected to a pyrolysis process at 300-1500° C.

14 Claims, No Drawings

PROCESS FOR THE PREPARATION OF CONDUCTIVE CARBON LAYERS ON POWDERED SUPPORTS

CROSS REFERENCE TO RELATED APPLICATIONS

This application is a continuation of PCT/PL2009/000081, filed on Aug. 13, 2009, which claims priority to PL Application No. PL385908, filed on Aug. 19, 2008, the contents of each being incorporated herein by reference.

FIELD OF THE INVENTION

The invention relates to a process for the preparation of conductive carbon layers on powdered supports, suitable in particular for electrode layers in lithium batteries.

BACKGROUND OF THE INVENTION

A process for the preparation of carbon layers by pyrolysis of organic compounds or polymers on powdered ceramic supports is known. "*A new method of coating powdered supports with conductive carbon films*" (M. Molenda, R. Dziembaj, Z. Piwowarska, M. Drozdek, J. Therm. Anal. Cal., 88, 2007, 503-506) discloses a process for the preparation of conductive carbon layers by pyrolysis of polyacrylonitrile deposited on $Al_2O_3$ grains. According to the process, radical polymerization of acrylonitrile in an aqueous $Al_2O_3$ suspension was carried out, followed by controlled pyrolysis of the such-obtained precursor, under argon atmosphere, at 400-800° C. for 12 h. Similarly, pyrolysis of poly(N-vinylformamide) (PNVF) deposited on powdered $Al_2O_3$ by wet impregnation from an aqueous solution was performed in "*Direct Preparation of Conductive Carbon Layer (CCL) on Alumina as a Model System for Direct Preparation of Carbon Coated Particles of the Composite Li-Ion Electrodes*" (M. Molenda, R. Dziembaj, M. Drozdek, E. Podstawka, L. M. Proniewicz, Solid State Ionics 179, 2008, 197-201).

In the case of conductive carbon layers intended for lithium batteries, the layers should be characterized by sufficient electrical conductivity, as well as easy transport of lithium ions through the layer during charging and discharging. At the same time, they should exhibit possibly low contact surface area with an electrolyte to suppress formation of a SEI (Solid-Electrolite Interphase) layer. Electrical properties of a carbon layer are improved with increase of pyrolysis temperature, however given limited thermal stability of electrode materials in reductive conditions it is required that the pyrolysis process is carried out at the lowest temperature possible. Carbon layers obtained by pyrolysis of a PNVF precursor did not exhibit sufficiently high electrical conductivity and possessed a high specific surface area.

The process for the preparation of carbon layers on powdered supports comprises dissolving hydrophilic polymer (PH) at a level of 85 to 99.9% by weight in water, adding pyromellitic acid (PMA) or pyromellitic dianhydride (PMDA) at a level of 0.1-15% by weight, followed by adding to the mixture a powdered support at a level of 1-99% by weight. The suspension is concentrated and dried, and then the prepared composite precursor is subjected to pyrolysis at 300-1500° C.

Preferably, the hydrophilic polymer is poly(N-vinylformamide), polyacrylamide or N-vinylformamide-acrylamide copolymers Preferably, the powdered support comprises metal oxides, lithium and transition metal silicates and polysilicates, lithium and transition metal phosphates and polyphosphates, germanates, vanadates, metals and metal alloys, metal nitrides and silicon.

Most preferably, the powdered support comprises $Al_2O_3$, $LiMn_2O_4$, $Li_{1-x}Mn_{2-2x}O_4$ ($0 \leq x \leq 0.33$), $LiMn_2O_{4-y}S_y$, ($0 \leq y \leq 0.25$), $LiFePO_4$, $LiM_xFe_{1-x}PO_4$ (M=V, Mn, Co, Ni, Cu; $0 \leq x \leq 1$), $Li_2MSiO_4$ (M=V, Mn, Fe, Co, Ni, Cu), $LiMSiO_4$ (M=V, Mn, Fe, Co, Ni, Cu), $LiCoO_2$, $LiM_xCO_{1-x}O_2$ (M=V, Fe, Co, Ni, Cu; $0 \leq x \leq 1$), $LiMn_{1/3}CO_{1/3}Ni_{1/3}O_2$, Sn, SnO, $SnO_2$, tin alloys, Si.

Preferably, the pyrolysis is carried out in inert conditions, preferably under inert gas atmosphere, most preferably argon, nitrogen or helium atmosphere.

Preferably, the pyrolysis is carried out in weakly reducing conditions.

Preferably, the pyrolysis is carried out under vacuum.

In the process of the invention, it was unexpectedly found that adding pyromellitic acid (PMA) or pyromellitic dianhydride (PMDA) to the hydrophilic polymer composition significantly enhances electrical properties of prepared carbon layers and at the same time allows decreasing temperature of the pyrolysis process.

DESCRIPTION OF THE INVENTION

In the process of the invention, pyromellitic acid or the anhydride thereof takes the role of a promoter which structuralizes graphitization of the polymer during pyrolysis, rather than being a layer-making factor—its pyrolysis does not lead to obtaining a carbonizate, but decomposition is complete. The planar structure of the molecule of pyromellitic acid or an anhydride thereof accelerates seeding and forming graphene layers, which facilitate two-dimensional crystallization of a graphite-like material. Additionally, pyromellitic acid or the anhydride thereof is thought to facilitate organization of hydrophilic polymer on the surface of the powdered support already at the impregnation step. It was unexpectedly found that the carbon layers originating from pyrolysis of the hydrophilic polymer composition with PMA or PMDA are closely adjacent and tightly cover grains of the support. At the same time the layers are not continuous by nature, having mesopores of a mean size of about 32-35 Å. Such modification of the carbon layer of the composite is particularly beneficial when employed as electrode layers in lithium batteries, since it protects well cathode material against reaction with the electrolyte and simultaneously secures unhampered diffusion of lithium ions through mesopores of the carbon layer.

In the process of the invention the composition of a carbon precursor (the water-soluble hydrophilic polymer) with a promoter which structuralizes graphitization of the polymer (PMA or PMDA) allows obtaining of the carbon layer with very good dispersion of carbon material and expected physicochemical properties, such as thickness, tightness and porosity. In particular, suitable electrical conductivity ($>10^{-4}$ $Scm^{-1}$) of the carbon layer prepared at above 400° C. can be obtained in the process.

Preferably the process proceeds entirely in aqueous environment and the precursors employed are non-toxic, which makes the technology safe and environmentally friendly.

The process of the invention can be employed for obtaining electrode composites (both cathodes and anodes) for lithium batteries. Electrode composites produced by the process of the invention are characterized by better electrical properties and increased chemical stability, that improves operational safety of lithium batteries. The process of the invention can also be employed for preparing composite adsorbents of defined surface morphology obtained from suitable inorganic supports.

The subject-matter of the invention is described in more detail in the following working examples.

EXAMPLE 1

10 g of freshly distilled N-vinylformamide (98%) was dissolved in 66 g of deionized water pre-treated with argon for about 30 minutes. The reaction was placed on a water bath and warmed to 35° C. under argon atmosphere. 1.9092 g of AIBA initiator (2,2'-azobis(2-methylpropionamidinyl) dichloride) was then added and the reaction was kept at 60° C. for 2 h. Poly(N-vinylformamide) thus obtained was air-dried for 24 h at 110° C.

0.625 g of dry poly-N-vinylformamide and 0.0329 g pyromellitic acid was dissolved in 12.5 cm$^3$ of deionized water. 0.375 g $LiMn_2O_{3.95}S_{0.05}$ was then added and the contents stirred for 15 minutes. The homogenous mixture formed was kept at 90° C. with continuous stirring for about 2 h to evaporate and concentrate it to a viscosity precluding sedimentation of the suspension. The composite precursor formed was transferred to a teflon container and air-dried for 24 h at 90° C.

The dried precursor was crumbled and pyrolyzed at 400° C. under argon atmosphere (99.999%), for 12 h. This yielded a carbon layer characterized by electrical conductivity of $7.4 \cdot 10^{-6}$ S/cm at 25° C. and electrical conductivity activation energy $E_a=0.34$ eV. Carbon content in the composite determined by TPO method was 27.6%.

EXAMPLE 2

0.7 g of dry poly(N-vinylformamide) and 0.04 g of pyromellitic acid were dissolved in 14.1 cm$^3$ of deionized water. 1.0 g of $LiMn_2O_4$ spinel was then added and the mixture stirred for 15 minutes. The homogenous mixture formed was kept at 90° C. with continuous stirring for about 2 h to evaporate and concentrate it to the viscosity precluding sedimentation of the suspension. The composite precursor formed was transferred to a teflon container and air-dried for 24 h at 90° C.

The dried precursor was crumbled and pyrolyzed at 400° C., under argon atmosphere (99.999%) for 12 h. This yielded a composite comprised of the $LiMn_2O_4$ support coated by a carbon layer, characterized by the electrical conductivity of $3.3 \cdot 10^{-6}$ S/cm at 25° C. and the electrical conductivity activation energy $E_a=0.37$ eV. Specific surface area of the composite as determined by BET isotherm method was 5.5 m$^2$/g, and carbon content in the composite was 20.3% (determined by TPO method).

EXAMPLE 3

Comparative 1.87045 g of dry (175° C./24 h) lithium nitrate (V) $LiNO_3$ was dissolved in 70 cm$^3$ of deionized water in a sealed glass vessel under the stream of argon (99.999%, 20 dm$^3$/h). 13.25465 g of manganese (II) acetate hydrate $Mn(CH_3COO)_2 \cdot 4H_2O$ (Aldrich 99.99%) was added to the solution. Once the substrates dissolved, 10 ml of 25% $NH_3$ aq was added dropwise until pH=10 was reached. The salmon-colored mixture (a sol) was left to condense for 24 h with continuous stirring and heating at about 100° C. in argon atmosphere (99.999%, 20 dm$^3$/h). The gel formed was transferred to a melting pot and air-dried at 90° C. for 48 h.

The dried xerogel precursor was crumbled and air-calcined at 300° C. (with heating rate of 1° C./min) for 24 h, followed by 6 h at 650° C. (with heating rate of 5° C./min).

The $LiMn_2O_4$ spinel obtained was characterized by electrical conductivity of $1.2 \cdot 10^{-4}$ S/cm at 25° C. and electrical conductivity activation energy $E_a=0.34$ eV. Specific surface area of the spinel as determined by BET isotherm method was 6.1 m$^2$/g.

EXAMPLE 4

0.8084 g of dry poly(N-vinylformamide) prepared as in Example 1 and 0.0365 g of pyromellitic dianhydride were dissolved in 10 cm$^3$ of deionized water. 1 g of $Al_2O_3$ was then added and the mixture stirred for 30 minutes. The homogenous mixture formed was kept at 90° C. with continuous stirring for about 3 h to evaporate and concentrate it to a viscosity precluding sedimentation of the suspension. The composite precursor formed was transferred to a teflon container and air-dried for 24 h at 90° C.

The dried precursor was crumbled and pyrolyzed at 550° C. in argon atmosphere (99.999%), for 6 h. This yielded a carbon layer characterized by electrical conductivity of $8.1 \cdot 10^{-4}$ S/cm at 25° C. Carbon content in the composite determined by TPO method was 13.5%.

EXAMPLE 5

Example 1 was followed, with corresponding change of parameters for the following samples:

5/1—1.002 g of the $LiMn_2O_4$ support, 0.9 g of PNVF, 0.0475 of PMA, 18 cm$^3$ of $H_2O$, 6 h pyrolysis time 5/2—1.001 g of the $LiMn_2O_4$ support 1.001 of g PNVF, 0.0527 of PMA, 20 cm$^3$ of $H_2O$, 6 h pyrolysis time 5/3—0.75 g of the $LiMn_2O_4$ support, 1,2501 g of PNVF, 0,0658 of PMA, 25 cm$^3$ of $H_2O$, 6 h pyrolysis time 5/4—0.5 g of the $LiMn_2O_{3.97}S_{0.03}$ support, 0.45 g of PNVF, 0.02375 of PMA, 9 cm$^3$ of $H_2O$, 12 h pyrolysis time 5/5—0.375 g of the $LiMn_2O_{3.97}S_{0.03}$ support, 0.62505 g of PNVF, 0.0329 of PMA, 12.5 cm$^3$ of $H_2O$, 6 h pyrolysis time 5/6—0.5 g of the $LiMn_2O_{3.95}S_{0.05}$ support, 0.45 g of PNVF, 0.02375 of PMA, 9 cm$^3$ of $H_2O$, 12 h pyrolysis time 5/7—0.5 g of the $LiMn_2O_{3.9}S_{o.1}$ support, 0.45 g of PNVF, 0.02375 of PMA, 9 cm$^3$ of $H_2O$, 12 h pyrolysis time 5/8—0.375 g of the $LiMn_2O_{3.9}S_{0.1}$ support, 0.625 g of PNVF, 0.03289 of PMA, 12.5 cm$^3$ of $H_2O$, 12 h pyrolysis time For materials of the C/Li—Mn—O—S type prepared according to Example 1 and Example 4, carbon content and surface morphology were estimated and studied. The estimated carbon content was determined based on pyrolysis of a 11% PMA and 89% PNVF precursor not deposited on a support. The actual carbon content was determined by temperature-programmed TPO oxidation, as disclosed in "*A new method of coating powdered supports with conductive carbon films*" (M. Molenda, R. Dziembaj, Z. Piwowarska, M. Drozdek, J. Therm. Anal. Cal., 88, 2007, 503-506). The determination was made with EGA-TGA/DTG/SDTA techniques on Mettler-Toledo 851$^e$ thermoanalyzer coupled with Thermostar Balzers quadrupole spectrometer. The measurements were performed in the air stream of 80 ml/min at the temperature range of 30-1000° C. with a heating rate of 5° C./min. The surface morphology was studied by BET isotherm method. Specific surface area measurements were carried out under the pressure of $5.7 \cdot 10^{-7}$ Pa on Micrometrics ASAP 2010 sorptiometer. The samples were degassed at 200-250° C. for 2 h under the pressure of 0.260.4 Pa. The results obtained are presented in Table 1.

TABLE 1

| Sample according to Example | Estimated carbon content [%] | Actual carbon content [%] | BET surface area [m²/g] | max. pore diameter [Å] | Pore distribution mean pore size [Å] |
|---|---|---|---|---|---|
| 2 | 14.3 | 20.3 | 5.5 | 123 | 34.1 and 51 |
| 5/1 | 18.7 | 23.4 | 8.5 | 140 | 32.7 |
| 5/2 | 27.1 | 24.2 | 8.9 | 120 | 35.0 |
| 5/3 | 30.4 | 33.9 | 7.4 | 130 | 34.8 |
| 5/4 | 19.4 | 18.6 | 10.2 | 100 | 33.5 |
| 5/5 | 28.0 | 32.5 | 12.5 | 89 | 32.9 |
| 5/6 | 19.0 | 21.1 | 9.1 | 127 | 33.1 |
| 5/7 | 20.2 | 19.8 | 9.6 | 105 | 33.8 |
| 5/8 | 28.4 | 30.5 | 8.4 | 112 | 33.9 |
| 3 | — | — | 6.1 | 174 | 200 |

The actual carbon content was greater than the estimated amount for all composites. This can prove a beneficial influence of pyromellitic acid or pyromellitic dianhydride on pyrolysis mechanism of the precursor deposited on support grains. The increase of carbon percentage on the support surface enhances its dispersion without local aggregation.

Characteristics of the obtained adsorption isotherms suggests the presence of pores in the form of microcracks and inter-grain splits. At the same time, pore size indicates the presence of mesopores of the very narrow and uniform diameter distribution in the range of 32-35 Å.

We claim:

1. A process for the preparation of carbon layers on powdered supports by pyrolysis of a hydrophilic polymer in an aqueous solution that is applied on a powdered support comprising the steps of;
    (a) adding 0.1-15 wt % pyromellitic acid or pyromellitic dianhydride to a hydrophilic polymer of 85-99.9 wt % dissolved in water to form a mixture;
    (b) adding to the mixture 1-99 wt % of a powdered support to form a suspension;
    (c) concentrating and drying the suspension to form a composite precursor;
    (d) pyrolyzing the composite precursor at 300-1500° C. to form a carbon layer on the powdered support;
    wherein the weight percentages are relative to the combined dry weight of pyromellitic acid or pyromellitic dianhydride and hydrophilic polymer; and
    wherein the carbon layer has mesopores with a diameter distribution peak of about 32-35 Å.

2. The process of claim 1, characterized in that the hydrophilic polymer is poly(N-vinylformamide).

3. The process of claim 1, characterized in that the hydrophilic polymer is polyacrylamide.

4. The process of claim 1, characterized in that the hydrophilic polymer is a copolymer of N-vinylformamide and acrylamide.

5. The process of claim 1, characterized in that the powdered support comprises metal oxides, lithium and transition metal silicates and polysilicates, lithium and transition metal phosphates and polyphosphates, germanates, vanadates, metals and metal alloys, metal nitrides, silicon.

6. The process of claim 5, characterized in that the powdered support is $Al_2O_3$, $LiMn_2O_4$, $Li_{1-x}Mn_{2-2x}O_4$ ($0 \leq x \leq 0.33$), $LiMn_2O_{4-y}S_y$ ($0 \leq y \leq 0.25$), $LiFePO_4$, $LiM_xFe_{1-x}PO_4$ (M=V, Mn, Co, Ni, Cu; $023$ $x \leq 1$), $Li_2MSiO_4$ (M=V, Mn, Fe, Co, Ni, Cu), $LiMSiO_4$ (M=V, Mn, Fe, Co, Ni, Cu), $LiCoO2$, $LiM_xCO_{1-x}O_2$ (M=V, Fe, Co, Ni, Cu; $0 \leq x \leq 1$), $LiMn_{1/3}Co_{1/3}Ni_{1/3}O_2$, Sn, SnO, $SnO_2$, tin alloys, Si.

7. The process of claim 1, characterized in that the powdered support is $Al_2O_3$, $LiMn_2O_4$, $Li_{1-x}Mn_{2-2x}O_4$ ($0 \leq x \leq 0.33$), $LiMn_2O_{4-y}S_y$ ($0 \leq y \leq 0.25$), $LiFePO_4$, $LiM_xFe_{1-x}PO_4$ (M=V, Mn, Co, Ni, Cu; $0 \leq x \leq 1$), $Li_2MSiO_4$ (M=V, Mn, Fe, Co, Ni, Cu), $LiMSiO_4$ (M=V, Mn, Fe, Co, Ni, Cu), $LiCoO_2$, $LiM_xCO_{1-x}O_2$ (M=V, Fe, Co, Ni, Cu; $0 \leq x \leq 1$), $LiMn_{1/3}Co_{1/3}Ni_{1/3}O_2$, Sn, SnO, $SnO_2$, tin alloys, Si.

8. The process of claim 1, characterized in that the pyrolysis is carried out in inert conditions.

9. The process of claim 8, characterized in that the pyrolysis is carried out under an inert gas atmosphere.

10. The process of claim 9, characterized in that the inert gas is argon.

11. The process of claim 9, characterized in that the inert gas is nitrogen.

12. The process of claim 9, characterized in that as the inert gas is helium.

13. The process of claim 1, characterized in that the pyrolysis is carried out in weakly reducing conditions.

14. The process of claim 1, characterized in that the pyrolysis is carried out under vacuum.

* * * * *